United States Patent Office 3,403,117
Patented Sept. 24, 1968

3,403,117
POLYOLEFIN CONTAINING POLYMERIC FATTY
ACID OR POLYAMIDE THEREOF
Don E. Floyd, Robbinsdale, Minn., assignor to General
Mills, Inc., a corporation of Delaware
No Drawing. Filed Sept. 13, 1963, Ser. No. 308,643
13 Claims. (Cl. 260—23)

This invention relates to novel compositions of polymers of alpha-olefins and to methods of rendering such polymers antistatic and improving the ink and dye receptivity thereof.

The problem of static electricity with polymers of alpha-olefins is well known. Also such polymers are known to be poor in their receptivity of inks and dyes. It has now been discovered that the addition to such polymers of certain agents renders such polymers antistatic and improves the receptivity to inks and dyes.

It is therefore an object of this invention to provide novel compositions of polymers of alpha-olefins.

It is also an object of this invention to provide such compositions which are antistatic and possess good receptivity to inks and dyes.

It is further an object of this invention to provide a method of rendering polymers of alpha-olefins antistatic and improving the ink and dye receptivity thereof.

These and other objects of the invention are accomplished by a composition of a polymer of an alpha-olefin and polymeric fat acid compound in which the polymeric fat acid compound is employed in an amount of from 0.1 to 5% by weight based on the amount of alpha-olefin polymers. The polymeric fat acids, including the alkyl esters thereof, themselves may be employed or the polyamide derivatives thereof with ethylene diamine or diethylene triamine.

Generally, all normally solid polymers of the lower (2–4 carbon atoms) alpha-olefins are useful in the present invention such as the homopolymers of ethylene, propylene and butene-1. Particularly useful are polyethylene and polypropylene. Copolymers of the monomers above mentioned are also useful as well as copolymers of these monomers and another co-monomer such as hexene-1, decene-1, or butadiene. The polymers may be formed using free radical initiators or by using the so-called coordination catalysts. Typical catalytic systems are titanium tetrachloride or titanium trichloride with organo-metallic reducing agents as exemplified in U.S. Patents 2,905,645 and 3,050,471. The invention is particularly suitable with polyethylene, either high or low density.

The term "polymeric fat acids" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8 to 24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxide catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids.

It is understood that the term "polymeric fat acids" includes the acids and such other derivatives capable of forming amides in a reaction with a diamine such as the lower alcohol esters of polymeric fat acids.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst.

Typical compositions of commercially available polymeric fat acids, based on unsaturated $C_{18}$ fat acids, are:

Percent by weight
$C_{18}$ monobasic acids ("monomer") _____ 5–15
$C_{36}$ dibasic acids ("dimer") _____ 60–80
$C_{54}$ (and higher) ("trimer") polybasic acids ____ 10–35

The relative ratios of monomer, dimer and trimer (or higher) in unfractionated polymeric fat acids are dependent on the nature of the starting material and the condition of polymerization. For the purposes of this invention, the term monomeric fat acids refers to the unpolymerized monomeric acids or derivatives present in the polymeric fat acids; the term dimeric fat acids refers to the dimeric acids or derivatives (formed by the dimerization of two fat acid molecules); and the term trimeric fat acids refers to the residual higher polymeric forms consisting primarily of trimeric acids or derivatives, but containing some higher polymeric forms.

For the purposes of this invention, the terms monomeric, dimeric, and trimeric fat acids, are defined further by a micromolecular distillation analytical method. The method is that of Paschke, R. F., et al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C. and the trimeric (or higher) fraction is calculated based on the residue.

Particularly suitable for use are the polymeric fat acid polyamides prepared either from the acids themselves or the esters thereof with a polyamine. The polyamines employed to react with the above described polymeric fat acids in the preparation of the amino polyamide are the alkylene diamines or triamines which may be defined by the formula $$R_2NR(NHR)_nNH_2$$

where R is an alkylene radical and $n$ is an integer of from 0 to 1. Illustrative of polybasic amines are ethylene diamine, diethylene triamine, hexamethylene diamine, di-1,3-propanetriamine, di-1,2-propanetriamine and the like. Thus, the alkylene radical in the above formula is generally ethylene but should not be limited thereto as alkylene groups having up to 6 carbon atoms may be employed.

Other monobasic or dibasic acids or esters thereof may be incorporated with the polymeric fat acids in the preparation of the polyamides encompassed by this invention which are illustrated by the following structural formula $$R''OOCR'COOR'' \text{ and } R'''COOR''$$

where R' is an arylene or alkylene hydrocarbon group containing from 2 to 12 carbon atoms, R'' is hydrogen or lower aliphatic hydrocarbon radicals having from 1 to 8 carbon atoms such as the alkyl groups, methyl, ethyl, propyl, butyl, hexyl and octyl and R''' is a group of from 1 to 22 carbon atoms, preferably hydrocarbon. Illustrative of dibasic acids of this type are sebacic, adipic, succinic, suberic, azelaic, glutaric, pimelic, isophthalic and terephthalic. R' is preferably 4-8 carbon atoms as in sebacic and adipic acid which are particularly preferred. Illustrative of the monobasic acids are acetic, propionic, butyric and the monocarboxylic fatty acids having 8-22 carbon atoms such as oleic, linoleic, linolenic, stearic, and palmitic. Hydroxy acids such as lactic and ricinoleic may be employed also.

The amidification reaction may be carried out under the usual conditions employed for this purpose, commonly about 2-4 hours at about 100-300° C. Generally, reactions at about 200° C. for about 3 hours are employed. At the higher temperatures, imidazoline linkages may be formed. The amine number referred to herein is the number of milligrams of potassium hydroxide equivalent to the amine group in one gram of product. The polyamides derived from diethylene triamine generally have an amine number in the range of about 50-200. With ethylene diamine, products having amine numbers as low as 3 are provided.

The invention can be further illustrated by means of the following examples in which all parts and percentages are by weight unless otherwise indicated. Unless otherwise indicated, the polymeric fat acids employed were typical available acids having the following average analysis:

| | Percent |
|---|---|
| Dimer | 66–73 |
| Trimer | 17–24 |
| Monomer | 8–12 |

Example I

A solution containing 40 grams of low density polyethylene (DYNH–1 grade) in 160 grams of toluene was prepared by heating under reflux. To one 100 gram portion was added 0.2 gram of a polyamide prepared from the condensation of polymeric fat acids and ethylene diamine at about 200° C. for about 3 hours, having an amine number of about 3, dissolved in hot toluene. This solution was poured into a tray and the solvent was allowed to evaporate. The other portion was also poured into a tray and the solvent allowed to evaporate. The residual solids were dried in a vacuum oven at 100° C. for 24 hours.

The dry solids were compression molded at 225° F. and 300 p.s.i. to give sheets measuring 6 inches by 6 inches by approximately 0.020 inch.

A white ink composed of 40 grams of the same polyamide described above, 40 grams of rutile titanium dioxide pigment, and 60 grams of 95% isopropanol was applied to the plastic sheets of Example I. The inks were dried four hours at room temperature. Then 4–5 inch strip of cellophane tape were applied with heavy hand pressure to the inks.

The strips were removed with a quick pull at an angle near 180°, with the following results:

Plain polyethylene—75% loss of adhesion by ink.
Polyethylene with polyamide addition—No loss of adhesion.

Example II

The procedure of Example I was followed, but in this instance the polyamide of Example I was incorporated into the polyethylene at levels of ½%, 1% and 2%. Then the ink adhesion test was made, 40 grams of a polyamide prepared from a mixture of polymeric fat acids and acetic acid with a mixture of ethylene diamine and diethylene triamine, 40 grams of rutile titanium oxide pigment, and 60 grams of denatured alcohol, as described in Example I.

| | Percent loss of adhesion |
|---|---|
| Plain polyethylene | 90 |
| Polyethylene with ½% of polyamide addition | 20 |
| Polyethylene with 1% of polyamide addition | 20 |
| Polyethylene with 2% of polyamide addition | 30 |

Some improvement is also obtained when high density polyethylene such as Marlex 65 is employed. However, the invention is particularly effective with low density polyethylene with regard to improvement in the ink and dye receptivity.

The polyamides may be combined with the polyethylene in various ways, as by solution blending, melting, milling or other procedures.

Example III

Another test was conducted using a 20% solution of polypropylene in hot xylene. Then 1% of the polyamide employed in Example I (solids basis) was added. Solvent was evaporated off and a plastic sheet was molded for the ink adhesion test described in Example I. Loss of adhesion on removal of tape was 75% as compared with 95% for a sheet of untreated polypropylene, thus showing that the ink receptivity of polypropylene is also improved.

Example IV

Additional testing with low-density polyethylene was conducted by preparing a 20% by weight solution of polyethylene (DYNH-1) in hot toluene and adding to it the following materials at the levels shown:

Material:  Percent level (on solids)
- (a) Polyamide of a mixture of polymeric fat acids and acetic acid with a mixture of ethylene diamine and diethylene triamine [1] (amine number 5.0) — 5
- (b) Polyamide of a mixture of polymeric fat acids and acetic acid with a mixture of ethylene diamine and diethylene triamine [1] (amine number 5.0) — 2
- (c) Polyamide of polymeric fat acids and diethylene triamine (amine number 89) — 2
- (d) Polyamide of polymeric fat acids and diethylene triamine (amine number 89) — 1
- (e) Polyamide of a fractionated polymeric fat acid [2] and hexamethylene diamine (amine number 1.3) — 2
- (f) Fractionated polymeric fat acid [2] — 0.25
- (g) Polymeric fat acids [3] — 0.5
- (h) No additive — —

[1] See following table:

| | |
|---|---|
| Equivalents of polymeric fat acids | 77.7 |
| Equivalent acetic acid | 22.3 |
| Equivalent ethylene diamine | 90 |
| Equivalent diethylene triamine | 10 |

[2] See following table:

| | Percent |
|---|---|
| Dimer | 98.8 |
| Trimer | 1.2 |
| Monomer | 0 |

[3] See following table:

| | Percent |
|---|---|
| Dimer | 73.3 |
| Trimer | 17.6 |
| Monomer | 9.1 |

Solvent was removed from each combination and the residual resin was compression molded to give a 6″ x 6″ x 0.020″ sheet. The systems and a similar one composed of the same polyethylene containing 1% of the polyamide employed in Example I were checked for antistatic properties by the following simple test. The sheet was rubbed vigorously on a wool cloth in a room at about 75° C. and 30% relative humidity. The sheet was then held about one inch above a container of cigar ashes. With system (h) a large amount of ash immediately "jumped" to the sheet and stuck to it. With the other systems there was essentially no ash going to the sheet—thus, all showed very good antistatic properties.

Ink adhesion tests, as described in the preceding paragraphs, were conducted. Also, tensile strength and elongation at break were determined for specimens cut from the sheets, using ASTM D-1248 test procedure and Instron Model TTC tester.

| System | Loss of adhesion tape test, (percent) | Tensile strength p.s.i. | Elongation, percent |
|---|---|---|---|
| (b) | 85 | 1,650 | 640 |
| (d) | 20 | 1,510 | 580 |
| (e) | 20 | 1,860 | 620 |
| (f) | 20 | (1) | (1) |
| (g) | 40 | (1) | (1) |
| (h) | 85 | 1,700 | 590 |

[1] Not tested.

It was also found that when polyamides of the higher polyamines such as triethylenetetramine are employed, problems of exudation and incompatibility arise.

The foregoing clearly illustrates the advantages of the present invention. The dye receptivity is improved as well as the antistatic properties. Where the polyamides are employed, amounts up to about 3% are preferably employed. However, in many cases amounts of about 5% may be employed, where the antistatic properties are desired, but where receptivity of dyes and inks are not of importance. Care must be taken, however, when using amounts larger than about 3%, as exudation and incompatibility problems may arise with some of the additives. Where the polymeric fat acids themselves or the esters thereof are employed, generally lower amounts on the order of 0.1 to 0.5% are employed as exudation and incompatibility problems may arise with larger amounts. The particular amount which may be employed without such problems is dependent largely on the dimer, trimer and monomer content of the polymeric fat acids. In view of the improved receptivity provided by the present invention, however, it will eliminate or minimize the necessity to treat polyethylene with flame or electron bombardment to make the surface adhesionable.

The embodiments of the invention in which an exclusive property or privilege is claimed are defined as follows:

1. A normally solid polymeric composition comprising a polymer of a monoalpha-olefin of 2–4 carbon atoms and from 0.1 to about 5% by weight based on said polymer of a compound selected from the group consisting of polymeric fat acids and the polyamides thereof with a polyamine of the formula $$H_2NR(NHR)_nNH_2$$

where R is an alkylene radical having from 2 to 6 carbon atoms and $n$ is an integer from 0 to 1.

2. The composition of claim 1 in which the polymer is polyethylene.
3. The composition of claim 1 in which the polymer is polypropylene.
4. The composition of claim 1 in which R is ethylene.
5. The composition of claim 4 in which $n$ is 0.
6. The composition of claim 4 in which $n$ is 1.
7. A normally solid polymeric composition comprising a polymer of a monoalpha-olefin of 2–4 carbon atoms and from 0.1 to 0.5% by weight based on said polymer of a polymeric fat acid.
8. The composition of claim 1 in which said polymeric fat acid is employed in an amount of 0.25%.
9. A normally solid polymeric composition comprising a polymer of a monoalpha-olefin of 2–4 carbon atoms and from 0.1 to about 3% of a polyamide of a polymeric fat acid and a polyamine of the formula $$H_2NR(NHR)_nNH_2$$

where R is an alkylene radical having from 2–6 carbon atoms and $n$ is an integer from 0 to 1.

10. The composition of claim 9 in which R is ethylene.
11. The composition of claim 10 in which $n$ is 0.
12. The composition of claim 10 in which $n$ is 1.
13. The composition of claim 9 in which R is hexamethylene and $n$ is 0.

References Cited
UNITED STATES PATENTS

| | | | |
|---|---|---|---|
| 2,468,534 | 4/1949 | Young et al. | 260—857 |
| 2,728,737 | 12/1955 | Wittcoff | 260—857 |
| 2,824,848 | 2/1958 | Wittcoff | 260—857 |
| 2,851,735 | 9/1958 | Hogg et al. | 260—23 |
| 2,889,292 | 6/1959 | Peerman | 260—857 |
| 2,921,048 | 1/1960 | Bell et al. | 260—45.9 |
| 3,206,429 | 9/1965 | Broyles et al. | 260—32.6 |
| 2,955,121 | 10/1960 | Meyers et al. | 260—407 |

OTHER REFERENCES

Floyd, "Polyamide Resins," 1958, p. 26.

DONALD E. CZAJA, *Primary Examiner.*

R. A. WHITE, *Assistant Examiner.*